US010139622B2

(12) United States Patent
Sasaki

(10) Patent No.: US 10,139,622 B2
(45) Date of Patent: Nov. 27, 2018

(54) HEAD-UP DISPLAY DEVICE

(71) Applicant: DENSO CORPORATION, Kariya, Aichi-pref. (JP)

(72) Inventor: Tatsuya Sasaki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/548,907

(22) PCT Filed: Feb. 5, 2016

(86) PCT No.: PCT/JP2016/000605
§ 371 (c)(1),
(2) Date: Aug. 4, 2017

(87) PCT Pub. No.: WO2016/132701
PCT Pub. Date: Aug. 25, 2016

(65) Prior Publication Data
US 2018/0017793 A1    Jan. 18, 2018

(30) Foreign Application Priority Data

Feb. 19, 2015    (JP) .................. 2015-030667

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *B60K 2350/1072* (2013.01);
(Continued)

(58) Field of Classification Search
CPC ................ G02B 27/0149; B60K 35/00; B60K 2350/1072; B60K 2350/2052; B60K 2350/352
(Continued)

(56) References Cited

U.S. PATENT DOCUMENTS 8,102,601 B2 * 1/2012 Sasaki ................ G02B 27/0149
345/7
8,743,296 B2 * 6/2014 Ishida .................... B60K 35/00
345/7

(Continued)

FOREIGN PATENT DOCUMENTS

JP    2012023806 A    2/2012
JP    2014052531 A    3/2014
JP    2014143850 A    8/2014

*Primary Examiner* — Ricky D Shafer
(74) *Attorney, Agent, or Firm* — Harness, Dickey & Pierce, P.L.C.

(57) ABSTRACT

A HUD device mounted on a moving body that projects an image on a projection member to virtually display the image includes a projector, a reflector mirror, a stepper motor, a reduction gear mechanism that reduces rotation which is output from the stepper motor and transmitted to the reflector mirror, and a controller that calculates a control step angle for the stepper motor. The controller, when an output direction of the motor according to the control instruction at this determination is the opposite direction as a direction of the rotation of the last time, adds a reverse step angle of the opposite direction, which is equal to or greater than a sum of a reference step angle and a backlash angle of the reduction gear mechanism, to the control step angle.

7 Claims, 7 Drawing Sheets

(52) U.S. Cl.
CPC ............... *B60K 2350/2052* (2013.01); *B60K 2350/352* (2013.01); *G02B 2027/0159* (2013.01)

(58) Field of Classification Search
USPC ........................................ 359/631, 632, 877
See application file for complete search history.

(56) References Cited

U.S. PATENT DOCUMENTS

| | | | | |
|---|---|---|---|---|
| 8,970,933 | B2* | 3/2015 | Sasaki | G02B 27/0149 340/815.74 |
| 9,036,234 | B2* | 5/2015 | Sasaki | G02B 27/0101 359/221.2 |
| 9,063,329 | B2* | 6/2015 | Jeon | G02B 27/0149 |
| 9,482,868 | B2* | 11/2016 | Sasaki | G02B 27/0149 |
| 9,641,057 | B2* | 5/2017 | Sasaki | G02B 27/01 |
| 9,766,452 | B2* | 9/2017 | Sasaki | B60K 35/00 |
| 2015/0226964 | A1 | 8/2015 | Sasaki et al. | |

* cited by examiner

HEAD-UP DISPLAY DEVICE

CROSS-REFERENCE TO RELATED APPLICATIONS

This application is a U.S. National Phase Application under 35 U.S.C. 371 of International Application No. PCT/JP2016/000605 filed on Feb. 5, 2016 and published in Japanese as WO 2016/132701 A1 on Aug. 25, 2016. This application is based on and claims the benefit of priority from Japanese Patent Application No. 2015-030667 filed on Feb. 19, 2015. The entire disclosures of all of the above applications are incorporated herein by reference.

TECHNICAL FIELD

The present disclosure relates to a head-up display device (hereinafter referred to as a HUD device) which is mounted on a moving body and projects an image onto a projection member to display the image as a virtual image visible to a passenger.

BACKGROUND

Conventionally, it is known that there are HUD devices which are mounted on a moving body and project an image onto a projection member to display the image as a virtual image visible to a passenger A HUD device disclosed in Patent Literature 1 includes a projection unit which projects display light, a reflector mirror which reflects the display light from the projection unit toward a projection member, a stepper motor that outputs rotation, a reduction gear mechanism that reduces the speed of the rotation output from the stepper motor and transmits this rotation to the reflector mirror, and a controller that controls the rotation of the stepper motor.

Based on control instructions from a passenger, when the location of the virtual image display is to be finely adjusted, a full step drive is performed such as changing a stepper angle.

PRIOR ART LITERATURE

Patent Literature

Patent Literature 1: JP 2012-23806 A

SUMMARY OF THE INVENTION

Such control instructions from a passenger may wish to move the position of the virtual image display in the same direction as the last time. In this case, when the stepper motor is rotated in the same direction as the last time, the reflector mirror may be rotated without a backlash effect in the reduction gear mechanism. As a result, the passenger is able to move the position of the virtual image display as intended.

Conversely, the passenger may wish to move the position of the virtual image display in the opposite direction as the last time. In this case, when the stepper motor is rotated in reverse as compared to last time, a backlash effect may exist in the reduction gear mechanism. Thus there is a concern that the reflector mirror may not rotate as much as the last time, or may not rotate at all. As a result, the passenger may not be able to move the position of the virtual display image as intended, and thereby feel a sense of discomfort.

In view of the above points, it is an object of the present disclosure to provide a HUD device that reduces the sense of discomfort for a passenger viewing a virtual image.

In the present disclosure, a head-up display device mounted on a moving body that projects an image on a projection member to virtually display the image to be visible to a passenger includes
 a projector that projects display light,
 a reflector mirror that reflects the display light from the projector toward the projection member,
 a stepper motor that outputs rotation,
 a reduction gear mechanism formed of a plurality of gears, the reduction gear mechanism reducing the rotation which is output from the stepper motor and transmitted to the reflector mirror, and
 a controller that, based on a control instruction from the passenger, calculates a control step angle that controls the rotation of the stepper motor, where
 the controller includes
 a determiner that determines whether an output direction of the rotation to be output from the stepper motor according to the control instruction at this determination is the same direction or the opposite direction as a direction of the rotation to be output from the stepper motor according to the control instruction at the last determination, and
 a reverse direction adder that defines a reference step angle as a step angle that the stepper motor rotates by in accordance with a determination of the same direction by the determiner, and when the determiner determines the opposite direction, adds a reverse step angle of the opposite direction to the control step angle, the reverse step angle of the opposite direction being equal to or greater than a sum of the reference step angle and a backlash angle of the reduction gear mechanism.

According to such a disclosure, the controller calculates the control step angle which controls the rotation of the stepper motor. When the controller determines the opposite direction as the last time, the reverse step angle of the reverse direction, which is greater or equal to a sum of the backlash angle of the reduction gear mechanism and the reference step angle, is added to the control step angle. Due to such a control, the stepper motor rotates in the opposite direction as the last time by an amount equal to the reverse step angle. Due to this, the rotation amount of the reflector mirror may be ensured, and the display position of the virtual display may be reliably moved. Accordingly, the passenger who views the virtual image may move the display position of the virtual display as intended, and thus a sense of discomfort may be reduced.

EMBODIMENTS FOR CARRYING OUT INVENTION

Figure 1:
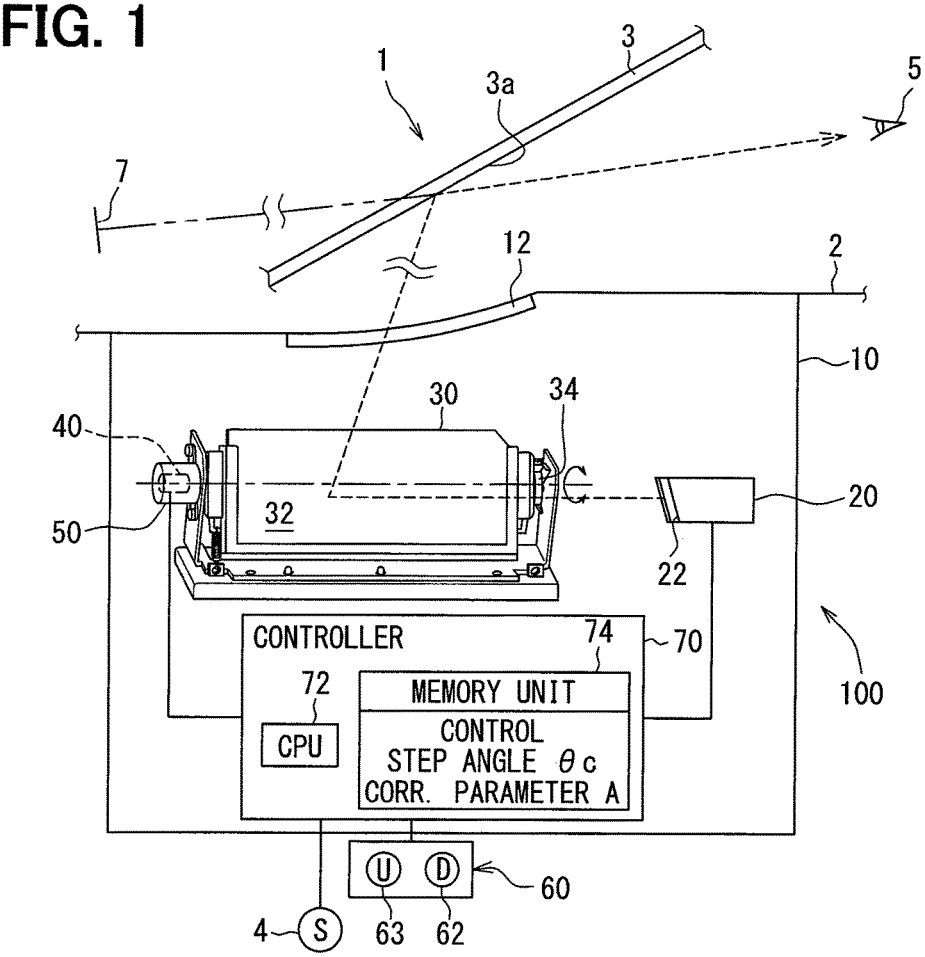
FIG. 1 is a configuration view showing an outline configuration of a HUD device according to a first embodiment.

Hereinafter, description will be given of the multiple embodiments of the present disclosure based on the drawings. Corresponding constituent elements in each embodiment are given the same reference numerals, and there are cases in which duplicated explanation is omitted. In a case in which only a portion of the configuration in each embodiment is described, the configuration of another embodiment which is described earlier may be applied for the other portions of the configuration. In addition to the combinations of configurations clearly depicted in the explanation of the embodiments, as long as problems do not particularly arise in a combination, the configurations of multiple embodiments may be partially combined with each other, even when not clearly described.

First Embodiment

As shown in FIG. 1, a HUD device 100 according to a first embodiment of the present disclosure is mounted on a vehicle 1 and housed within an instrument panel 2. The vehicle 1 is a kind of moving body. The HUD device 100 projects an image onto a windshield 3 of the vehicle 1. The windshield 3 acts as a projection member. As a result, the HUD device 100 displays the image as a virtual image visible to a passenger 5 in the vehicle 1. In other words, the display light of the image reflected at the windshield 3 reaches the eyes of the passenger 5 in the vehicle 1, and the passenger 5 sees this display light as a virtual image 7. Due to the virtual image 7, the passenger 5 is able to recognize various information. For example, the information included in the virtual display of the image may include vehicle status values such as vehicle speed or remaining fuel, road information, or vision support information such as navigation information.

The windshield 3 of the vehicle 1 includes an inward surface having a projection surface 3a on which the image is projected. The projection surface 3a may be formed as, for example, a curved concave surface or a level flat surface. Further, instead of the windshield 3, a projection member may be provided as a combiner disposed inside the vehicle 1. Such a combiner would be provided separately from the vehicle 1, and the image would be projected onto this combiner.

Further, in the following discussion, an up-down direction of the vehicle 1 corresponds to the direction of gravity when the vehicle 1 is traveling or stopped on flat ground. Further, an up direction of the vehicle 1 is opposite to a down direction of the vehicle 1.

The HUD device 100 includes a housing 10, a projector 20, a reflector mirror 30, a stepper motor 40, a reduction gear mechanism 50, an instruction switch 60, an a controller 70.

The housing 10 has a hollow shape and houses the other elements 20, 30, 40, 50, 70 of the HUD device 100. The housing 10 is disposed inside the instrument panel 2 of the vehicle 1. The housing 10 includes a dust-proof sheet 12 which is transmissive to display light. The dust-proof sheet 12 is disposed in a position to face the windshield 3 in the up-down direction. The windshield 3 is fixed in front of a driver seat 1a in which the passenger 5 sits (see FIG. 2 as well).

The projector 20 is a liquid crystal type projection device. The projector 20 includes an internal backlight and a light transmissive screen 22 to project display light as an image. Further, instead of a liquid crystal type, the projector 20 may be, for example, a laser scanner type in which laser light is sent to a scanning mirror and by scanning the orientation of the scanning mirror, the light is formed as an image on a screen.

The reflector mirror 30 includes a reflection screen 32. The reflection screen 32 may be formed by, for example, depositing aluminum on a front surface of a substrate formed of synthetic resin or glass etc. In the present embodiment, the reflection screen 32 is formed as a smooth curved surface with a concave center portion forming a concave surface. The reflector mirror 30 reflects the display light from the projector 20 through the dust-proof sheet 12 toward the windshield 3.

Figure 2:
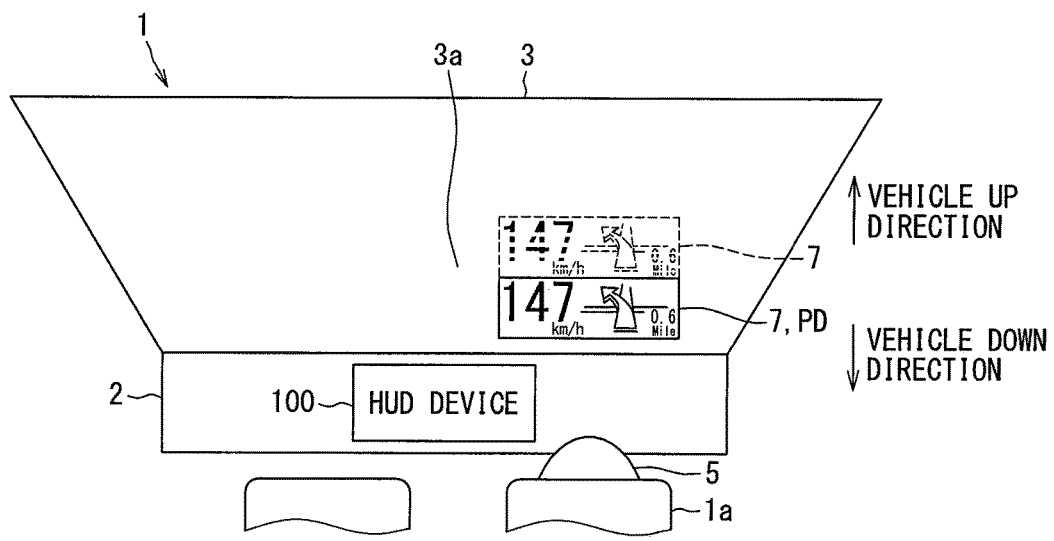
FIG. 2 is a schematic view showing a display position of a virtual image in a HUD device of FIG. 1.

Further, the reflector mirror 30 includes a rotation shaft 34 which is rotatably supported by the housing 10. Due to rotation of the rotation shaft 34, the angle of the reflection screen 32 of the reflector mirror 30 about the rotation shaft 34 may be adjusted. As such, as shown in FIG. 2, a display position PD which is a position of the virtual display of the display light may be moved in a predetermined direction (this direction being the up-down directions of the vehicle in the present embodiment). A display region RD is defined as a region in which the image is visible to the passenger 5, and a outside-of-display region ROD is defined as a region in which the image is not visible to the passenger 5. The rotation shaft 34 is able to set the angle of the reflector mirror 30 such that the display position PD exceeds the display region RD to enter the outside-of-display region ROD.

Figure 3:
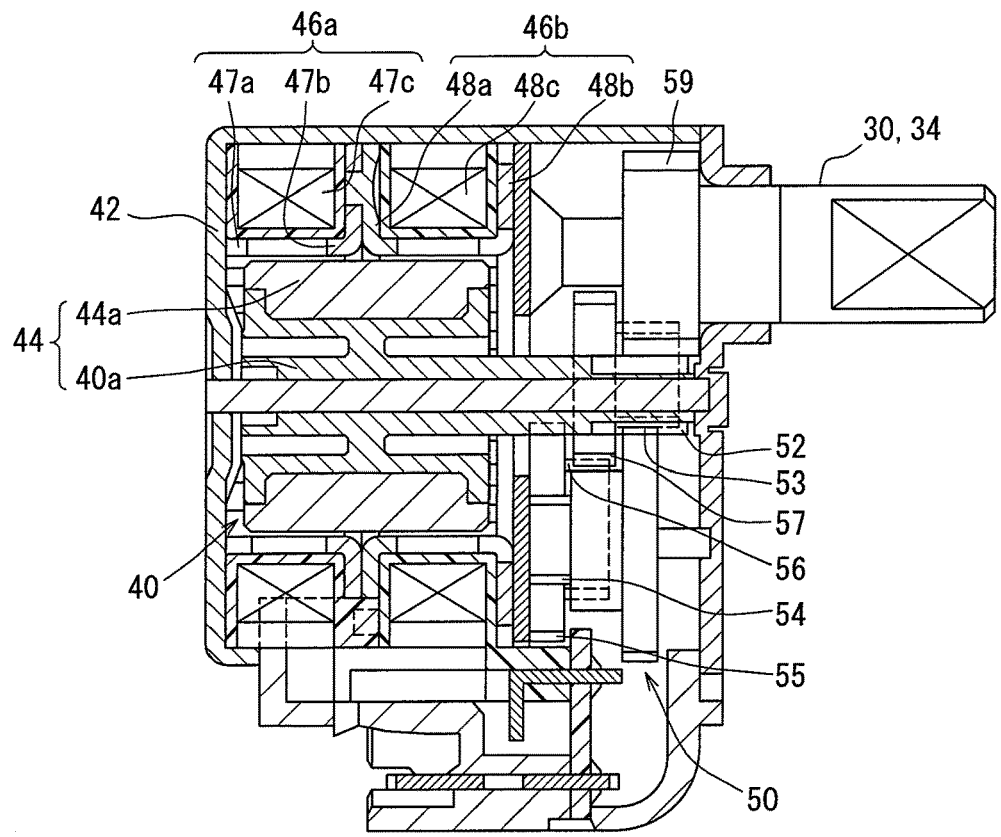
FIG. 3 is an enlarged cross section view showing a stepper motor and a reduction gear mechanism of FIG. 1.
Figure 4:
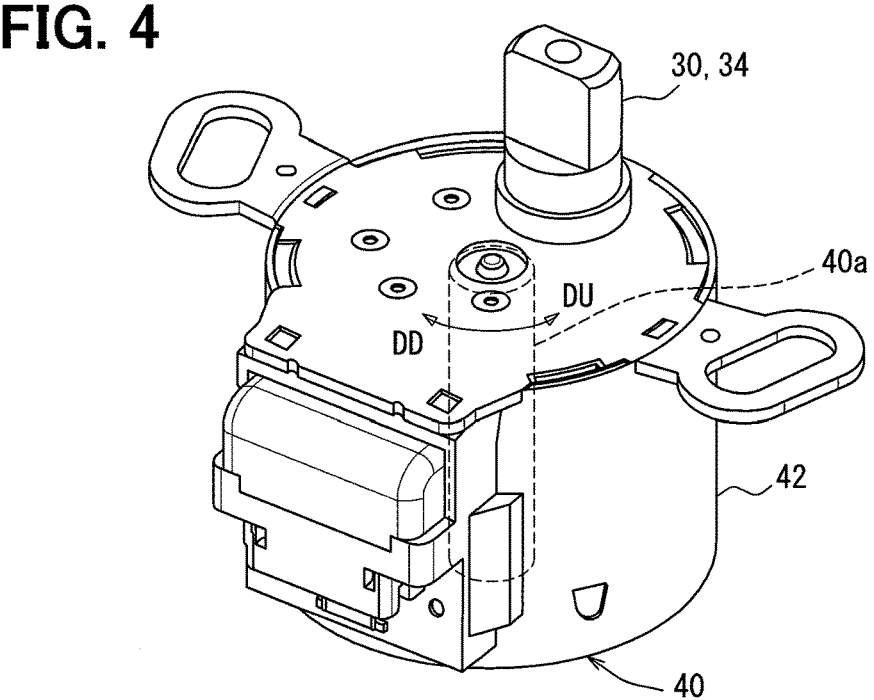
FIG. 4 is an enlarged perspective view showing a stepper motor and a reduction gear mechanism of FIG. 1.

As shown in FIGS. 3 and 4, the stepper motor 40 is a permanent magnet type motor with claw pole structure, and outputs rotation. The stepper motor 40 includes a casing 42, a rotor 44, and stators 46a, 46b. The hollow casing 42 is retained in the housing 10 (see FIG. 1), and houses the other elements 44, 46a, 46b of the stepper motor 40. The rotor 44 assembles with a magnet rotor 44a on an other periphery of a motor shaft 40a. The motor shaft 40a is rotatably supported by the casing 42. The motor shaft 40a rotates in a down-corresponding direction DD and an up-corresponding direction DU as shown in FIG. 4. The magnet rotor 44a is formed of a permanent magnet having a plurality of each of opposite magnetic poles.

Two phase stators 46a, 46b are retained by the casing 42 on an outer periphery of the rotor 44. An A phase stator 46a includes magnetic yokes 47a, 47b and a coil 47c. A B phase stator 46b includes magnetic yokes 48a, 48b and a coil 48c. In the A phase, the coil 47c is disposed coaxially with the magnetic yokes 47a, 47b, and in the B phase, the coil 48c is disposed coaxially with the magnetic yokes 48a, 48b. The coil 47c and the coil 48c are offset from each other in the axial direction. Due to this configuration, the stepper motor 40 may rotate the motor shaft 40a together with the magnet rotor 44a by applying a drive signal and exciting the coils 47c, 48c of each phase A and B.

Figure 5:
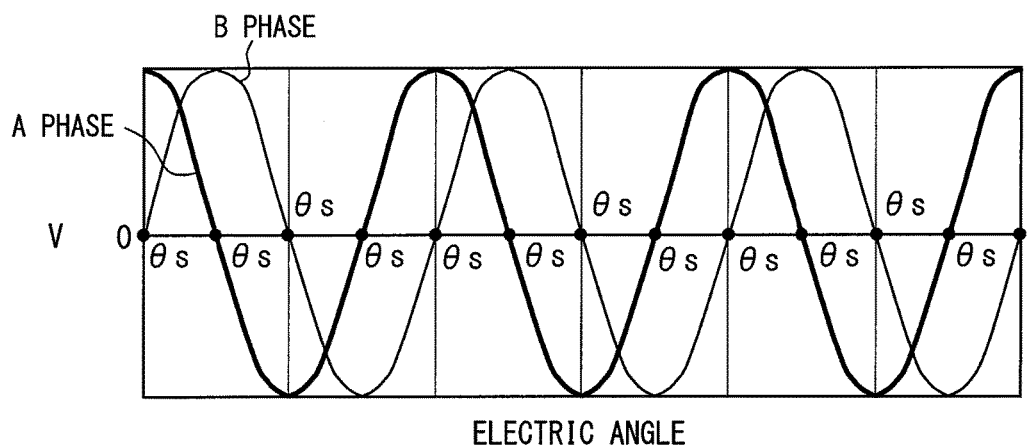
FIG. 5 is a characteristics chart for explaining superimposed drive signals to a stepper motor of FIG. 1.

The drive signal applied to the A phase coil 47c, as shown in the graph of FIG. 5 by the thick line, is assumed to follow a cosine function that alternates with a voltage amplitude V according to electric angle. Conversely, the drive signal applied to the B phase coil 48c, as shown in the graph of FIG. 5 by the thin line, is assumed to follow a sine function that alternates with a voltage amplitude V according to electric angle. By applying these drive signals in the stepper motor 40, an electric stability point θs appears about every 90 degrees of electric angle. Further, in the following explanation, the drive signals applied to each of the A, B phase coils 47c, 48b are simply referred to as a "drive signal".

As shown in FIG. 3, the reduction gear mechanism 50 meshes a plurality of gears 52 to 59 in series in the casing 42. These gears 52 to 59 may be formed by a synthetic resin such as polybutylene terephthalate (PBT) resin. Specifically, a first stage gear 52 is formed at the motor shaft 40a. A first idler gear 53 and a first pinion gear 54 are integrally and rotatably supported by the casing 42. The first idler gear 53 is meshed with the first stage gear 52 so that the rotation speed of the motor shaft 40a is reduced and transmitted to the first pinion gear 54. A second idler gear 55 and a second pinion gear 56 are integrally and rotatably supported by the casing 42. The second idler gear 55 is meshed with the first pinion gear 54 such that the rotation speed of this gear 54 is further reduced and transmitted to the second pinion gear 56. A third idler gear 57 and a third pinion gear 58 are integrally and rotatably supported by the casing 42. The third idler gear 57 is meshed with the second pinion gear 56 such that the rotation speed of this gear 56 is further reduced and transmitted to the third pinion gear 58. A final stage gear 59 is formed at the rotation shaft 34 and is meshed with the third pinion gear 58 such that the rotation speed of this gear 58 is further reduced and transmitted to the reflector mirror 30.

Figure 6:
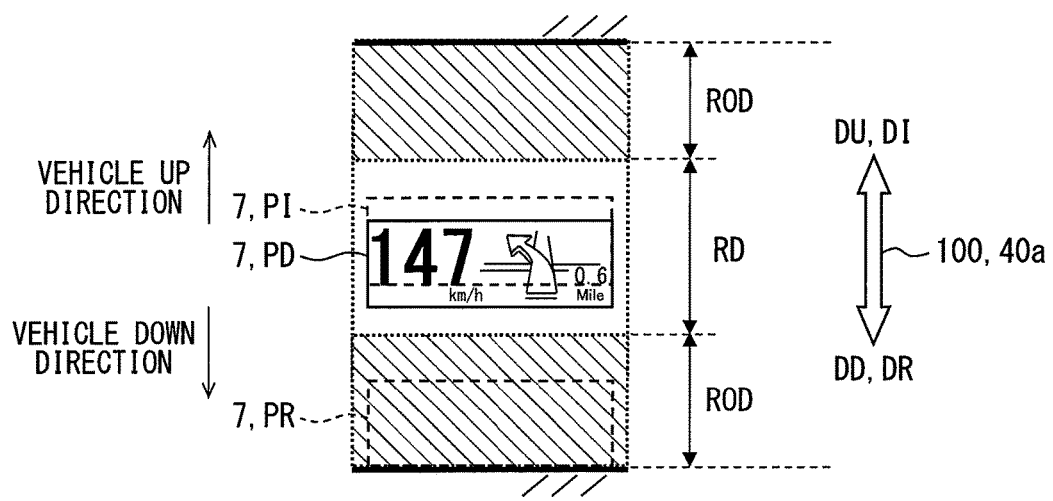
FIG. 6 is a schematic view for explaining a display position in a HUD device of FIG. 1.

As shown in FIG. 6, having such a rotation transmission path, the reduction gear mechanism 50 reduces a rotation in the down-corresponding direction DD output from the motor shaft 40a and transmits this rotation to the reflector mirror 30. As a result, the display position PD, which corresponds to the angle of the reflector mirror 30, may be moved in the down direction of the vehicle 1, for example. In other words, the down-corresponding direction DD is a direction that causes the virtually displayed image to move in the down direction of the vehicle 1. Conversely, the reduction gear mechanism 50 reduces a rotation in the up-corresponding direction DU output from the motor shaft 40a and transmits this rotation to the reflector mirror 30. As a result, the display position PD, which corresponds to the angle of the reflector mirror 30, may be moved in the up direction. In other words, the up-corresponding direction DU is a direction that causes the virtually displayed image to move in the up direction of the vehicle 1.

Backlash exists as a clearance between each of the gears 52 to 59 of the reduction gear mechanism. Accordingly, hysteresis occurs when the rotation of the motor shaft 40a reverses, and until the motor shaft 40a rotates for a certain rotation angle, the rotation is not transmitted to the reflector mirror 30. In the present embodiment, a prescribed angle due to the effects of backlash is defined as a backlash angle θb.

Figure 7:
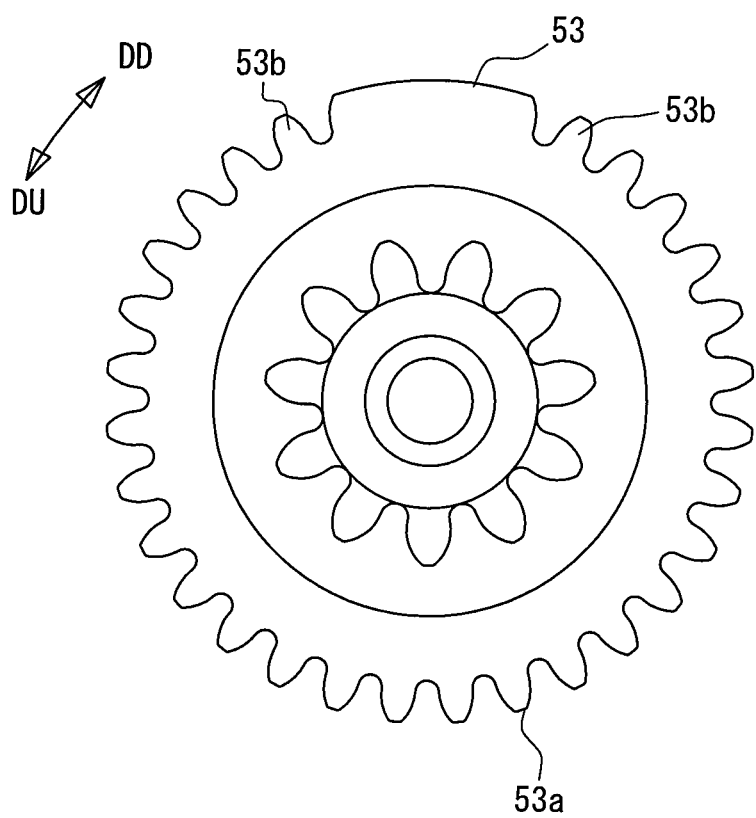
FIG. 7 is a plane view showing a stopper gear portion of a reduction gear mechanism of FIG. 4.

As shown in FIG. 7, among the gears 52 to 59, the first idler gear 53 includes a stopper gear portion 53a which is partially gear shaped. In particular, the stopper gear portion 53a includes teeth 53b which are formed within a region of less than 360 degrees in the rotation direction of the stopper gear portion 53a. As a result of this configuration, for a rotation in the down-corresponding direction DD output from the motor shaft 40a, when a teeth 53b at one end of the stopper gear portion 43a meshes with the first stage gear 52, the angle of the reflector mirror 30 stops at a predetermined angle corresponding to a outside-of-display region ROD (see FIG. 6). Conversely, for a rotation in the up-corresponding direction DU output from the motor shaft 40a, when a teeth 53b at the other end of the stopper gear portion 43a meshes with the first stage gear 52, the angle of the reflector mirror 30 stops at a predetermined angle corresponding to a outside-of-display region ROD (see FIG. 6) on the opposite side as before.

The instruction switch 60 is, as shown in FIG. 1, disposed outside of the housing 10 so as to be operable by the passenger 5 on the driver's seat. For instance, the instruction switch 60 may be mounted on the steering wheel of the vehicle 1. The instruction switch 60 includes two operation members 62, 63 which may be, for example, push buttons. Specifically, a down operation member 62 receives an operation from the passenger 5 as a down control instruction for causing the display position PD to move downward. In addition, an up operation member 63 receives an operation from the passenger 5 as an up control instruction for causing the display position PD to move upward. With such a configuration, the instruction switch 60 is able to differentiate between and output an instruction signal of a down control instruction inputted by operation of the down operation member 62 and an instruction signal of an up control instruction inputted by operation of the up operation member 63.

As shown in FIG. 1, the controller 70 is disposed in the housing 10. The controller 70 is an electric circuit configured as a control circuit. The controller 70 primarily includes a CPU 72, and also include a memory unit 74. The CPU 72 is configured to execute computer programs stored on the memory unit 74 to perform various processes. In addition to these computer programs, the memory unit 74 stores a control step angles θc as well as correction parameters A for correcting these control step angles θc. In the present embodiment, the control step angles θc are stored on a non-volatile memory of the memory unit 74, while the correction parameters A are stored on a volatile memory of the memory unit 74.

In addition, the controller 70, the projector 20, the instruction switch 60, and the coils 47c, 48c of the stepper motor 40 are electrically connected. The controller 70 controls the projection of display light from the projector 20, and also controls the rotation of the stepper motor 40 in accordance with control instructions from a passenger through the instruction switch 60. Specifically, when an instruction signal is input from the instruction switch 60, the controller 70 calculates a control step angle θc that controls the rotation of the stepper motor 40 based on this instruction signal. Then, the controller 70 outputs a drive signal according to the calculated control step angle θc to the coils 47c, 48c of the stepper motor 40.

The control step angles θc is an angle for control, and is a unit step angle of a predetermined electric angle between electric stability points θs in the stepper motor 40. In the present embodiment, one step angle of the unit step angle corresponds to an electric angle of 180 degrees. When the motor shaft 40a is rotated by one step angle, assuming that no backlash occurs in the reduction gear mechanism, the angle of the reflector mirror 30 changes by 0.176 degrees. In addition, in the present embodiment, the control step angles θc are represented as numbers 0 to 80, and these numbers are assigned on a control basis such that the larger the number, the more proceeds in the up-corresponding direction DU. Further, the control step angles θc function as control parameters that relate the display position PD with the angle of the reflector mirror 30.

In addition, the controller is electrically connected to an engine switch 4 of the vehicle 1. When the engine switch 4 is off, the controller 70 rotates the reflector mirror 30 in a reset direction DR such that the display position PD moves toward the outside-of-display region ROD until the reflector mirror 30 arrives at a predetermined angle corresponding to a reset position PR. In the first embodiment, the reset direction DR is the down-corresponding direction DD.

When the engine switch 4 is turned on again, the reflector mirror 30 is rotated in an initialization direction DI from the outside-of-display region ROD to an initialization position PI in the display region RD. The initialization position PI is set as a position corresponding to a control step angle $\theta c$ stored in the memory unit 74. In the first embodiment, the initialization direction DI is the up-corresponding direction DU.

Next, a flow chart of a computer program process executed by the controller 70 of the HUD device 100 of the first embodiment will be explained in detailed using FIG. 8. As explained previously, when the engine switch 4 is in an off state, the angle of the reflector mirror 30 becomes such that the display position PD becomes the reset position PR in the outside-of-display region ROD. At this angle of the reflector mirror 30, even if display light is projected by the projector 20, the display light is not visible to a passenger, so the projection of display light by the projector 20 is suspended. In this state, if the engine switch 4 is turned on, a process based on the flowchart of FIG. 8 begins.

First at step S10, the display position PD is moved from the reset position PR to the initialization position PI. In other words, the motor shaft 40a is controlled to rotate the reflector mirror 30 in the initialization direction DI, i.e., the up-corresponding direction DU, which goes from the outside-of-display region ROD toward the initialization position PI. After step S10, continue to step S20.

At step S20, the initialization position PI setup is complete. Specifically, the angle of the reflector mirror 30 has reached an angle corresponding to the initialization position PI. In other words, when rotated by the control step angle $\theta c$ stored in the memory unit 74, a virtual display of an image begins due to projection of display light by the projector 20. After step S20, continue to step S30.

At step S30, as a display position adjustment mode, the input of an instruction signal of a control instruction is received by the passenger 5 operating the instruction switch 60. After the control instruction is input, continue to S40.

At step S40, a determination of the present control instruction input at step S30 is performed. Specifically, it is determined whether an output direction of the rotation output from the stepper motor 40 based on the control instruction at this determination is the same direction or the opposite direction as the direction of the rotation output from the stepper motor 40 according to the control instruction during the previous determination. The previous determination means the last time that the determination of step S40 was performed during the repetition of this step S40 in the present flowchart loop.

If this is the first time that step S40 is performed after completing the setup of the initialization position PI, then instead of comparing with the last time, it is determined whether an output direction of the rotation output from the stepper motor 40 based on the control instruction at this determination is the same direction or the opposite direction as the initialization direction DI.

When a determination of the same direction is made, continue to step S50.

Conversely, if the output direction of this time is determined to be in an opposite direction, then a step S40, a further determination is made regarding this output direction. Specifically, a determination is made as to whether the last time was the down-corresponding direction DD then this time is the up-corresponding direction DU, or whether the last time was the up-corresponding direction DU then this time is the down-corresponding direction DD. If this result is a determination that the output direction changed from the up-corresponding direction DU to the down-corresponding direction DD, then continue to step S52. If this result is a determination that the output direction changed from the down-corresponding direction DD to the up-corresponding direction DU, then continue to step S54.

Further, these determinations may be stored as, e.g., transitions in the control step angle $\theta c$ in the memory unit 74 so that this history may be referred to. Alternatively, a method of storing the output direction itself may be used.

Next, when step S40 determines same direction and proceeds to step S50, a reference step angle $\theta 0$ of the same direction is added to the control step angle $\theta c$. In other words, the post-addition control step angle $\theta c$ is equal to the reference step angle $\theta 0$ of the same direction added to the pre-addition control step angle $\theta c$. After step S50, continue to step S60.

At step S60, the correction parameter A is unchanged, then proceed to step S70.

When, at step S40, reverse direction is determined and the output direction is determined as changing from the up-corresponding direction DU to the down-corresponding direction DD, then at step S52, a reverse step angle $\theta 1$ of the reverse direction is added to the control step angle $\theta c$. In other words, the post-addition control step angle $\theta c$ is equal to one reverse step angle $\theta 1$ of the reverse direction added to the pre-addition control step angle $\theta c$. Here, the reverse step angle $\theta 1$ is set to be equal to or greater than a sum of the backlash angle $\theta b$ and the reference step angle $\theta 0$. The reference step angle $\theta 0$ is a step angle output from the stepper motor in accordance to a determination of same direction at step S40. After performing step S52, continue to step S62.

At step S62, the correction parameter is overwritten based on a slippage in the control step angle $\theta c$, this slippage being estimated from the backlash angle $\theta b$. Specifically, in the first embodiment, the output direction of this time does not coincide with the initialization direction DI, so the correction parameter is overwritten with the backlash angle $\theta b$. After performing step S62, continue to step S70.

When, at step S40, reverse direction is determined and the output direction is determined as changing from the down-corresponding direction DD to the up-corresponding direction DU, then at step S54, a reverse step angle $\theta 1$ of the reverse direction is added to the control step angle $\theta c$. In other words, similar to step S52, the post-addition control step angle $\theta c$ is equal to one reverse step angle $\theta 1$ of the reverse direction added to the pre-addition control step angle $\theta c$. After performing step S54, continue to step S64.

At step S64, the correction parameter is overwritten based on a slippage in the control step angle $\theta c$, this slippage being estimated from the backlash angle $\theta b$. Specifically, in the first embodiment, the output direction of this time coincides with the initialization direction DI, so the correction parameter is overwritten with 0. After performing step S64, continue to step S70.

After performing steps S60, S62, S64, then at step S70, it is determined whether or not the display position PD adjustment operation has finished. For example, ending of the adjustment operation could be detected when a specified amount of time has elapsed. As another example, an end operation member may be provided in, e.g., the instruction switch 60 for ending the display position adjustment mode, and the input of a end control instruction may be determined based on the operation of this end operation member. If the determination at step S70 is negative, then return to step S30, and repeat the process of steps S30 to S70. If the determination at step S70 is positive, continue to step S72.

At step S72, an adjustment termination process is performed for the display position PD. Specifically, reception of instruction signals of control instructions from the passenger 5 operating the instruction switch 60 is terminated. After performing step S72, continue to step S80.

At step S80, due to turning off the engine switch 4, driving is considered to be finished, and the use of the HUD device 100 is also considered to be finished. Specifically, projection of display light by the projector 20 is stopped, and the reflector mirror 30 is rotated in the down-corresponding direction DD as the reset direction DR such that the display position PD moves to the reset position PR of the outside-of-display region ROD. As a result, the virtual display of the image is reset. After performing step S80, continue to step S90.

At step S90, after the display position PD has moved to the reset position PR, the control step angle θc is updated by the correction parameter A. Specifically, the updated control step angle θc is calculated by adding the correction parameter A to the pre-update control step angle θc. With step S90, one sequence of the process ends.

In the HUD device 100 of the first embodiment, the behavior of the reflector mirror 30 when controlled based on the above flowchart will be explained with the following examples 1, 2.

Example 1

In the first example, the backlash angle θb is equal to 1 step angle. Then, the reference step angle θ0 is set to 1 step angle, and the reverse step angle θ1 is set to 2 step angles which is equal to or greater than the sum of the reference step angle θ0 and the backlash angle θb. In particular, in the first example, the reverse step angle θ1 is set to be equal to the sum of the reference step angle θ0 and the backlash angle θb.

Here, Table 1 shows the behaviors of the control step angle θc, the actual angle of the reflector mirror 30, and the correction parameter A. In Table 1, one row represents the control step angle θc, the actual angle of the reflector mirror 30, and the correction parameter A at the time of reaching step S70 for each loop in the repeated loops of steps S30 to S70. Further, in Table 1, the actual angle of the reflector mirror 30 as shown is converted into step angles where 1 step angle is 0.176 degrees converted into an angle corresponding to unit step angles of the control step angle θc.

TABLE 1

| TIMES | CONTROL STEP ANGLE θc | ACTUAL ANGLE OF REFLECTOR MIRROR | A |
| --- | --- | --- | --- |
| 0 | 40 | 40 | 0 |
| 1 | 41 | 41 | 0 |
| 2 | 42 | 42 | 0 |
| 3 | 40 | 41 | +1 |
| 4 | 39 | 40 | +1 |
| 5 | 41 | 41 | 0 |
| 6 | 39 | 40 | +1 |

When the engine switch 4 is turned on, the processing of steps S10, S20 is performed. In other words, the motor shaft 40a is rotated in the up-corresponding direction, and the initialization position PI is set. Here, the control step angle θc is set to 40. The actual angle of the reflector mirror 30 is set to the equal to the control step angle θc at 40. The correction parameter A is set to 0 (refer to the 0th time row). The reduction gear mechanism 50 at the time of the setup of the initialization position PI is not in a state of hysteresis in the up-corresponding direction DU.

At the 1st time, an up control instruction is input at step S30. As a result, at step S40 a determination of the same direction is made, and steps S50, S60 are performed. Here, the control step angle θc is set to 41, which is calculated by adding the reference step angle θc of the same direction, which is +1, to the pre-addition control step angle θc, which is 40. The actual angle of the reflector mirror 30 becomes 41 which is the same as the control step angle θc, due to rotating in the same direction where there is no effect of backlash. The correction parameter A remains at 0.

At the 3rd time, a down control instruction is input at step S30. As a result, at step S40 a determination of the opposite direction and the output direction changing from the up-corresponding direction to the down-corresponding direction is made, and steps S52, S62 are performed. Here, the control step angle θc is set to 40, which is calculated by adding the reverse step angle θ1 of the opposite direction, which is −2, to the pre-addition control step angle θc, which is 42. The actual angle of the reflector mirror 30 becomes 41 which is different from the control step angle θc, due to not rotating by an amount equal in magnitude to the backlash angle θb because of the effects of backlash. The correction parameter A is set to +1 which is equal in magnitude to the backlash angle θb.

At the 4th time, a down control instruction is input at step S30. As a result, at step S40 a determination of the same direction is made, and steps S50, S60 are performed. Here, the control step angle θc is set to 39, which is calculated by adding the reference step angle θc of the same direction, which is −1, to the pre-addition control step angle θc, which is 40. The actual angle of the reflector mirror 30 becomes 40 which is different from the control step angle θc, due to rotating in the same direction where there is no effect of backlash, so the slippage resulted from the 3rd time remains as is. The correction parameter A remains at +1.

At the 5th time, an up control signal is input at step S30. As a result, at step S40 a determination of the opposite direction and the output direction changing from the down-corresponding direction DD to the up-corresponding direction DU is made, and steps S54, S64 are performed. Here, the control step angle θc is set to 41, which is calculated by adding the reverse step angle θ1 of the opposite direction, which is +2, to the pre-addition control step angle θc, which is 39. The actual angle of the reflector mirror 30 becomes 41 which is the same as the control step angle θc, due to not rotating by an amount equal in magnitude to the backlash angle θb because of the effects of backlash which is canceled out with the slippage that remained until the 4th time. The correction parameter A is set to 0.

At the 6th time, finally, the adjustment is terminated, and steps S72, S80, S90 are performed. At step S70 of the 6th time, the control step angle θc is 39, the actual angle of the reflector mirror 30 is 40, and the correction parameter A is +1, however the control step angle θc is updated at S90. In other words, the updated control angle θc is updated to 40, which is calculated by adding the value of the correction parameter A, which is +1, to the pre-update control step angle θc, which is 39.

In this first example, when a determination of an opposite direction as the last time is made, the reverse step angle θ1 of the reserve direction, which is a sum of the reference step angle θ0 and the backlash angle θb, is added to the control step angle θc. Accordingly, with respect to the control instruction of one time, the actual angle of the reflector mirror 30 reliably changes by one step angle.

Further, since the control step angle θc is updated by the correction parameter A, the slippage with the actual position of the reflector mirror 30 is eliminated. Due to this, when the engine switch 4 is turned on again, control may be started in a state where the control step angle θc matches the actual angle of the reflector mirror 30.

Example 2

In the second example as well, the backlash angle θb, the reference step angle θ0, and the reverse step angle θ1 are the same values as those of the first example. Here, the behaviors of the control step angle θc, the actual angle of the reflector mirror 30, and the correction parameter A are shown in Table 2 in a similar manner as the first example.

| TIMES | CONTROL STEP ANGLE θc | ACTUAL ANGLE OF REFLECTOR MIRROR | A |
| --- | --- | --- | --- |
| 0 | 40 | 40 | 0 |
| 1 | 38 | 39 | +1 |
| 2 | 37 | 38 | +1 |
| 3 | 39 | 39 | 0 |
| 4 | 40 | 40 | 0 |

When the engine switch 4 is turned on, the processing of steps S10, S20 is performed. In other words, the motor shaft 40a is rotated in the up-corresponding direction DU, and the initialization position PI is set. Here, the control step angle θc is set to 40. The actual angle of the reflector mirror 30 is set to the equal to the control step angle θc at 40. The correction parameter A is set to 0 (refer to the 0th time row). The reduction gear mechanism 50 at the time of the setup of the initialization position PI is not in a state of hysteresis in the up-corresponding direction DU.

At the 1st time, a down control instruction is input at step S30. As a result, at step S40 a determination of the opposite direction and the output direction changing from the up-corresponding direction DU to the down-corresponding direction DD is made, and steps S52, S62 are performed. Here, the control step angle θc is set to 38, which is calculated by adding the reverse step angle θ1 of the opposite direction, which is −2, to the pre-addition control step angle θc, which is 40. The actual angle of the reflector mirror 30 becomes 39 which is different from the control step angle θc, due to not rotating by an amount equal in magnitude to the backlash angle θb because of the effects of backlash. The correction parameter A is set to +1 which is equal in magnitude to the backlash angle θb.

At the 2nd time, a down control instruction is input at step S30. As a result, at step S40 a determination of the same direction is made, and steps S50, S60 are performed. Here, the control step angle θc is set to 37, which is calculated by adding the reference step angle θc of the same direction, which is −1, to the pre-addition control step angle θc, which is 38. The actual angle of the reflector mirror 30 becomes 38 which is different from the control step angle θc, due to rotating in the same direction where there is no effect of backlash, so the slippage resulted from the 1st time remains as is. The correction parameter A remains at +1.

At the 3rd time, an up control instruction is input at step S30. As a result, at step S40 a determination of the opposite direction and the output direction changing from the down-corresponding direction DD to the up-corresponding direction DU is made, and steps S54, S64 are performed. Here, the control step angle θc is set to 39, which is calculated by adding the reverse step angle θ1 of the opposite direction, which is +2, to the pre-addition control step angle θc, which is 37. The actual angle of the reflector mirror 30 becomes 39 which is the same as the control step angle θc, due to not rotating by an amount equal in magnitude to the backlash angle θb because of the effects of backlash which is canceled out with the slippage that remained until the 2nd time. The correction parameter A is set to 0.

At the 4th time, finally, the adjustment is terminated, and steps S72, S80, S90 are performed. At step S70 of the 4th time, the control step angle θc is 40, and the actual position of the reflector mirror 30 is 40. Further, the correction parameter A is 0, so the control step angle θc is substantially not updated.

In this second example, when a determination of an opposite direction as the last time is made, the reverse step angle θ1 of the reserve direction, which is a sum of the reference step angle θ0 and the backlash angle θb, is added to the control step angle θc. Accordingly, with respect to the control instruction of one time, the actual angle of the reflector mirror 30 reliably changes by one step angle.

Further, in the first embodiment, the controller 70 performing step S40 provides a "determiner", the controller 70 performing steps S52, S54 provides a "reverse direction adder", the controller 70 performing step S50 provides a "same direction adder", the controller performing step S90 provides an "updater", the controller 70 performing steps S60, S62, S64 provides an "overwriter", the controller 70 performing step S80 provides a "resetter", and the controller 70 performing steps S10, S20 provides an "initialization position setter".

(Operation Effects)

The operation effects of the first embodiment described above will be explained below.

According to the first embodiment, the controller 70 calculates the control step angle θc which controls the rotation of the stepper motor 40. When the controller 70 determines the opposite direction as the last time, the reverse step angle θ1 of the reverse direction, which is greater or equal to a sum of the backlash angle θb of the reduction gear mechanism 50 and the reference step angle θ0, is added to the control step angle θc. Due to such a control, the stepper motor 40 rotates in the opposite direction as the last time by an amount equal to the reverse step angle θ1. Due to this, the rotation amount of the reflector mirror 30 may be ensured, and the display position PD of the virtual display may be reliably moved. Accordingly, the passenger 5 who views the virtual image 7 may move the display position PD of the virtual display as intended, and thus a sense of discomfort may be reduced.

Further, according to the first embodiment, when a determination of the same direction as the last time is made, the reference step angle θ0 of the same direction is added to the control step angle θc. Due to this control, the stepper motor 40 rotates in the same direction as the last time by an amount equal to the reference step angle θ0. Due to this, the rotation amount of the reflector mirror 30 may be ensured, and the display position PD of the virtual display may be reliably moved. Accordingly, the passenger 5 who views the virtual image 7 may move the display position PD of the virtual display as intended even in the case of the same direction as the last time, and thus a sense of discomfort may be reduced.

Further, according to the first embodiment, the memory unit 74 which stores the control step angle θc and the correction parameter A is provided, and when a determination of the opposite direction as the last time is made, the controller 70 overwrites the correction parameter A based on a slippage estimated from the backlash angle θb with respect to the control step angle θc. Then, the control step angle θc is corrected by the correction parameter A. Since the control step angle θc is corrected by the correction parameter A which reflects a slippage estimated from the backlash angle θb with respect to the control step angle θc, slippage between the control step angle θc and the actual angle of the reflector mirror 30 due to the effects of backlash may be suppressed from repeatedly accumulating during use of the HUD device 100. Accordingly, it is possible to reduce a sense of discomfort caused by slippage between the controlled display position and the actual display position PD.

Further, according to the first embodiment, when a determination of the same direction as the last time is made, the correction parameter A remains unchanged. In the case of the same direction, there is no backlash effect, so by keeping the correction parameter A as is, a sense of discomfort may be reduced.

Further, according to the first embodiment, the controller 70 rotates the reflector mirror 30 in the reset direction DR where the image moves toward the outside-of-display region ROD to reset the display of the image. Then, the controller 70 rotates the reflector mirror 30 in the initialization direction DI moving from the outside-of-display region ROD toward the initialization position PI corresponding to the control step angle θc to begin displaying the image. According to such a controller 70, this time, when the output direction of the rotation output from the stepper motor 40 matches the initialization direction DI, the correction parameter A is set to 0, and when the rotation output from the stepper motor 40 does not match the initialization direction DI, the correction parameter A is set to the backlash angle θb. In other words, in a situation where the reduction gear mechanism 50 rotates in the opposite direction as the initialization direction DI, the control step angle θc slips from the actual angle of the reflector mirror 30 corresponding to this control step angle θc by an amount equal in magnitude to the backlash angle θb. Conversely, in a situation where the reduction gear mechanism 50 rotates in the initialization direction DI, this slippage equal in magnitude to the backlash angle θb is canceled out, and as a result, the control step angle θc matches the actual angle of the reflector mirror 30. Accordingly, it is possible to suppress this slippage from repeatedly accumulating during use of the HUD device 100.

Further, according to the first embodiment, the reset direction DR is the down-corresponding direction DD, and the initialization direction DI is the up-corresponding direction DU. In such a HUD device 100, the controller 70 does not change the correction parameter A when a determination of the same direction as the last time is made. Further, when a determination of the opposite direction as the last time is made, and when the output direction is the down-corresponding direction DD, the controller 70 sets the correction parameter A to the backlash angle θb. Further, when a determination of the opposite direction as the last time is made, and when the output direction is the up-corresponding direction DU, the controller 70 sets the correction parameter A to 0. By setting the correction parameter A in this manner, according to the reset direction DR and the initialization direction DI, slippage between the actual angle of the reflector mirror 30 and the control step angle θc may be reliably suppressed from repeatedly accumulate from use.

Second Embodiment

A second embodiment of the present disclosure is a modification of the first embodiment. The second embodiment will be primarily explained with reference to differences with the first embodiment.

Figure 9:
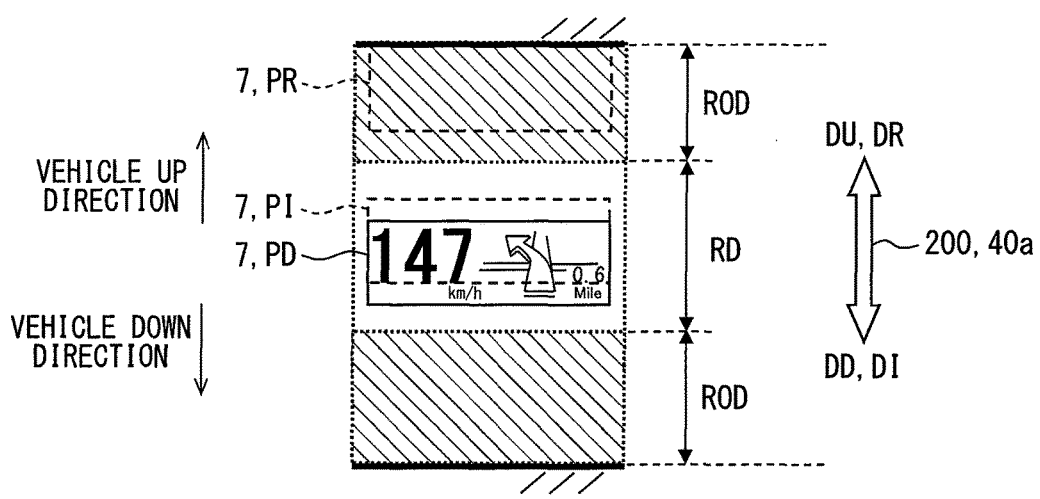
FIG. 9 is a view corresponding to FIG. 6 for a second embodiment.

According to the second embodiment, as shown in FIG. 9, the reset direction DR is the up-corresponding direction DU, and the initialization direction DI is the down-corresponding direction DD.

Next, a controller of a HUD device 200 of the second embodiment executes computer programs to perform a flowchart which will be explained using FIG. 10. In the same manner as the first embodiment, when the engine switch 4 is in an off state, the angle of the reflector mirror 30 is such that the display position PD is at the reset position PR of the outside-of-display region ROD. At this angle of the reflector mirror 30, even if the projector 20 is projecting display light, the passenger is unable to see this, so the projector 20 is stopped from projecting display light. In this state, when the engine switch 4 is turned on, a process based on the flowchart of FIG. 10 begins.

First at step S210, the display position PD is moved from the reset position PR to the initialization position PI. In other words, the motor shaft 40a is controlled to rotate the reflector mirror 30 in the initialization direction DI, i.e., the down-corresponding direction DD, which goes from the outside-of-display region ROD toward the initialization position PI. After step S210, continue to step S220.

The processing of steps S220 to S240 are the same as the processing of steps S20 to S40 of the first embodiment.

When a determination of the same direction is made at step S240, steps S250, S260 are performed, the processing of which is the same as steps S50, S60 of the first embodiment. After performing step S260, continue to step S270.

When a determination of the opposite direction is made at step S240, and a determination of the output direction changing from the up-corresponding direction DU to the down-corresponding direction DD is made, then step S252 is performed, the processing of which is the same as step S52 of the first embodiment. After performing step S252, continue to step S262.

At step S262, the correction parameter is overwritten based on a slippage in the control step angle θc, this slippage being estimated from the backlash angle θb. Specifically, in the second embodiment, the output direction of this time coincides with the initialization direction DI, so the correction parameter is overwritten with 0. After performing step S262, continue to step S270.

When a determination of the opposite direction is made at step S240, and a determination of the output direction changing from the down-corresponding direction to the up-corresponding direction is made, then step S254 is performed, the processing of which is the same as step S54 of the first embodiment. After performing step S254, continue to step S264.

At step S264, the correction parameter is overwritten based on a slippage in the control step angle θc, this slippage being estimated from the backlash angle θb. Specifically, in the second embodiment, the output direction of this time does not coincide with the initialization direction DI, so the correction parameter is overwritten with the backlash angle θb. After performing step S264, continue to step S270.

After processing steps S260, S262, S264, the processing of steps S270 to S272 are the same as the processing of steps S70 to S72 of the first embodiment. After processing step S272, continue to step S280.

At step S280, due to turning off the engine switch 4, driving is considered to be finished, and the use of the HUD device 200 is also considered to be finished. Specifically, projection of display light by the projector 20 is stopped, and the reflector mirror 30 is rotated in the up-corresponding direction DU as the reset direction DR such that the display position PD moves to the reset position PR of the outside-of-display region ROD of the image. As a result, the virtual display of the image is reset. After performing step S280, continue to step S290. With step S290, which is the same as step S90 of the first embodiment, one sequence of the process ends.

In the HUD device 200 of the second embodiment, the behavior of the reflector mirror 30 when controlled based on the above flowchart will be explained with the following examples 3, 4.

Example 3

In the third example, the backlash angle $\theta b$ is equal to 1 step angle. Then, the reference step angle $\theta 0$ is set to 1 step angle, and the reverse step angle $\theta 1$ is set to 2 step angles which is equal to or greater than the sum of the reference step angle $\theta 0$ and the backlash angle $\theta b$. In particular, in the third example, the reverse step angle $\theta 1$ is set to be equal to the sum of the reference step angle $\theta 0$ and the backlash angle $\theta b$. Here, the behaviors of the control step angle $\theta c$, the actual angle of the reflector mirror 30, and the correction parameter A are shown in Table 3 in a similar manner as the first embodiment.

TABLE 3

| TIMES | CONTROL STEP ANGLE $\theta c$ | ACTUAL ANGLE OF REFLECTOR MIRROR | A |
|---|---|---|---|
| 0 | 40 | 40 | 0 |
| 1 | 39 | 39 | 0 |
| 2 | 38 | 38 | 0 |
| 3 | 40 | 39 | −1 |
| 4 | 41 | 40 | −1 |
| 5 | 39 | 39 | 0 |

When the engine switch 4 is turned on, the processing of steps S210, S220 is performed. In other words, the motor shaft 40a is rotated in the down-corresponding direction DD, and the initialization position PI is set. Here, the control step angle $\theta c$ is set to 40. The actual angle of the reflector mirror 30 is set to the equal to the control step angle $\theta c$ at 40. The correction parameter A is set to 0 (refer to the 0th time row). The reduction gear mechanism 50 at the time of the setup of the initialization position PI is not in a state of hysteresis in the down-corresponding direction DD.

At the 1st time, a down control instruction is input at step S230. As a result, at step S240 a determination of the same direction is made, and steps S250, S260 are performed. Here, the control step angle $\theta c$ is set to 39, which is calculated by adding the reference step angle $\theta c$ of the same direction, which is −1, to the pre-addition control step angle $\theta c$, which is 40. The actual angle of the reflector mirror 30 becomes 39 which is the same as the control step angle $\theta c$, due to rotating in the same direction where there is no effect of backlash. The correction parameter A remains at 0.

At the 3rd time, an up control instruction is input at step S230. As a result, at step S240 a determination of the opposite direction and the output direction changing from the down-corresponding direction DD to the up-corresponding direction DU is made, and steps S254, S264 are performed. Here, the control step angle $\theta c$ is set to 40, which is calculated by adding the reverse step angle $\theta 1$ of the opposite direction, which is +2, to the pre-addition control step angle $\theta c$, which is 38. The actual angle of the reflector mirror 30 becomes 39 which is different from the control step angle $\theta c$, due to not rotating by an amount equal in magnitude to the backlash angle $\theta b$ because of the effects of backlash. The correction parameter A is set to −1 which is equal in magnitude to the backlash angle $\theta b$.

At the 4th time, an up control instruction is input at step S230. As a result, at step S240 a determination of the same direction is made, and steps S250, S260 are performed. Here, the control step angle $\theta c$ is set to 41, which is calculated by adding the reference step angle $\theta c$ of the same direction, which is +1, to the pre-addition control step angle $\theta c$, which is 40. The actual angle of the reflector mirror 30 becomes 40 which is different from the control step angle $\theta c$, due to rotating in the same direction where there is no effect of backlash, so the slippage resulted from the 3rd time remains as is. The correction parameter A remains at −1.

At the 5th time, a down control signal is input at step S230. As a result, at step S240 a determination of the opposite direction and the output direction changing from the up-corresponding direction DU to the down-corresponding direction DD is made, and steps S252, S262 are performed. Here, the control step angle $\theta c$ is set to 39, which is calculated by adding the reverse step angle $\theta 1$ of the opposite direction, which is −2, to the pre-addition control step angle $\theta c$, which is 41. The actual angle of the reflector mirror 30 becomes 39 which is the same as the control step angle $\theta c$, due to not rotating by an amount equal in magnitude to the backlash angle $\theta b$ because of the effects of backlash which is canceled out with the slippage that remained until the 4th time. The correction parameter A is set to 0.

At the 5th time, finally, the adjustment is terminated, and steps S272, S280, S290 are performed. At step S270 of the 5th time, the control step angle $\theta c$ is 39, and the actual angle of the reflector mirror 30 is 39. Further, the correction parameter A is 0, so the control step angle $\theta c$ is substantially not updated.

In this third example, when a determination of an opposite direction as the last time is made, the reverse step angle $\theta 1$ of the reserve direction, which is a sum of the reference step angle $\theta 0$ and the backlash angle $\theta b$, is added to the control step angle $\theta c$. Accordingly, with respect to the control instruction of one time, the actual angle of the reflector mirror 30 reliably changes by one step angle.

Fourth Example

In the fourth example as well, the backlash angle $\theta b$, the reference step angle $\theta 0$, and the reverse step angle $\theta 1$ are the same values as those of the third example. Here, the behaviors of the control step angle $\theta c$, the actual angle of the reflector mirror 30, and the correction parameter A are shown in Table 4 in a similar manner as the first example.

TABLE 4

| TIMES | CONTROL STEP ANGLE θc | ACTUAL ANGLE OF REFLECTOR MIRROR | A |
|---|---|---|---|
| 0 | 40 | 40 | 0 |
| 1 | 42 | 41 | −1 |
| 2 | 43 | 42 | −1 |
| 3 | 41 | 41 | 0 |
| 4 | 40 | 40 | 0 |

When the engine switch 4 is turned on, the processing of steps S210, S220 is performed. In other words, the motor shaft 40a is rotated in the down-corresponding direction DD, and the initialization position PI is set. Here, the control step angle θc is set to 40. The actual angle of the reflector mirror 30 is set to the equal to the control step angle θc at 40. The correction parameter A is set to 0 (refer to the 0th time row). The reduction gear mechanism 50 at the time of the setup of the initialization position PI is not in a state of hysteresis in the down-corresponding direction DD.

At the 1st time, an up control instruction is input at step SS30. As a result, at step S240 a determination of the opposite direction and the output direction changing from the down-corresponding direction to the up-corresponding direction is made, and steps S254, S264 are performed. Here, the control step angle θc is set to 42, which is calculated by adding the reverse step angle θ1 of the opposite direction, which is +2, to the pre-addition control step angle θc, which is 40. The actual angle of the reflector mirror 30 becomes 41 which is different from the control step angle θc, due to not rotating by an amount equal in magnitude to the backlash angle θb because of the effects of backlash. The correction parameter A is set to −1 which is equal in magnitude to the backlash angle θb.

At the 2nd time, an up control instruction is input at step S230. As a result, at step S240 a determination of the same direction is made, and steps S250, S260 are performed. Here, the control step angle θc is set to 43, which is calculated by adding the reference step angle θc of the same direction, which is +1, to the pre-addition control step angle θc, which is 42. The actual angle of the reflector mirror 30 becomes 42 which is different from the control step angle θc, due to rotating in the same direction where there is no effect of backlash, so the slippage resulted from the 1st time remains as is. The correction parameter A remains at −1.

At the 3rd time, a down control instruction is input at step S230. As a result, at step S240 a determination of the opposite direction and the output direction changing from the up-corresponding direction DU to the down-corresponding direction DD is made, and steps S252, S262 are performed. Here, the control step angle θc is set to 41, which is calculated by adding the reverse step angle θ1 of the opposite direction, which is −2, to the pre-addition control step angle θc, which is 43. The actual angle of the reflector mirror 30 becomes 41 which is the same as the control step angle θc, due to not rotating by an amount equal in magnitude to the backlash angle θb because of the effects of backlash which is canceled out with the slippage that remained until the 2nd time. The correction parameter A is set to 0.

At the 4th time, finally, the adjustment is terminated, and steps S272, S280, S290 are performed. At step S270 of the 4th time, the control step angle θc is 40, and the actual position of the reflector mirror 30 is 40. Further, the correction parameter A is 0, so the control step angle θc is substantially not updated.

In this fourth example, when a determination of an opposite direction as the last time is made, the reverse step angle θ1 of the reserve direction, which is a sum of the reference step angle θ0 and the backlash angle θb, is added to the control step angle θc. Accordingly, with respect to the control instruction of one time, the actual angle of the reflector mirror 30 reliably changes by one step angle.

As explained above, in the second embodiment as well, when a determination of the opposite direction is made at step S240, the controller 70 adds the reverse step angle θ1 of the reverse direction, which is greater than or equal to a sum of the backlash angle θb of the reduction gear mechanism 50 and the reference step angle θ0, to the control step angle θc. Accordingly, the same operation effects as the first embodiment may be exhibited.

Further, according to the second embodiment, the reset direction DR is the up-corresponding direction DU, and the initialization direction DI is the down-corresponding direction DD. In such a HUD device 100, the controller 70 does not change the correction parameter A when a determination of the same direction as the last time is made. Further, when a determination of the opposite direction as the last time is made, and when the output direction is the up-corresponding direction DU, the controller 70 sets the correction parameter A to the backlash angle θb. Further, when a determination of the opposite direction as the last time is made, and when the output direction is the down-corresponding direction DD, the controller 70 sets the correction parameter A to 0. By setting the correction parameter A in this manner, according to the reset direction DR and the initialization direction DI, slippage between the actual angle of the reflector mirror 30 and the control step angle θc may be reliably suppressed from repeatedly accumulate from use.

Further, in the second embodiment, the controller 70 performing step S240 provides a "determiner", the controller 70 performing steps S252, S254 provides a "reverse direction adder", the controller 70 performing step S250 provides a "same direction adder", the controller performing step S290 provides an "updater", the controller 70 performing steps S260, S262, S264 provides an "overwriter", the controller 70 performing step S280 provides a "resetter", and the controller 70 performing steps S210, S220 provides an "initialization position setter".

Other Embodiments

Above, a plurality of embodiments of the present disclosure are explained, but the present disclosure is not intended to be interpreted as being limited to these embodiments, and a variety of embodiments and combinations may be applied without departing from the gist of the present disclosure.

Figure 8:
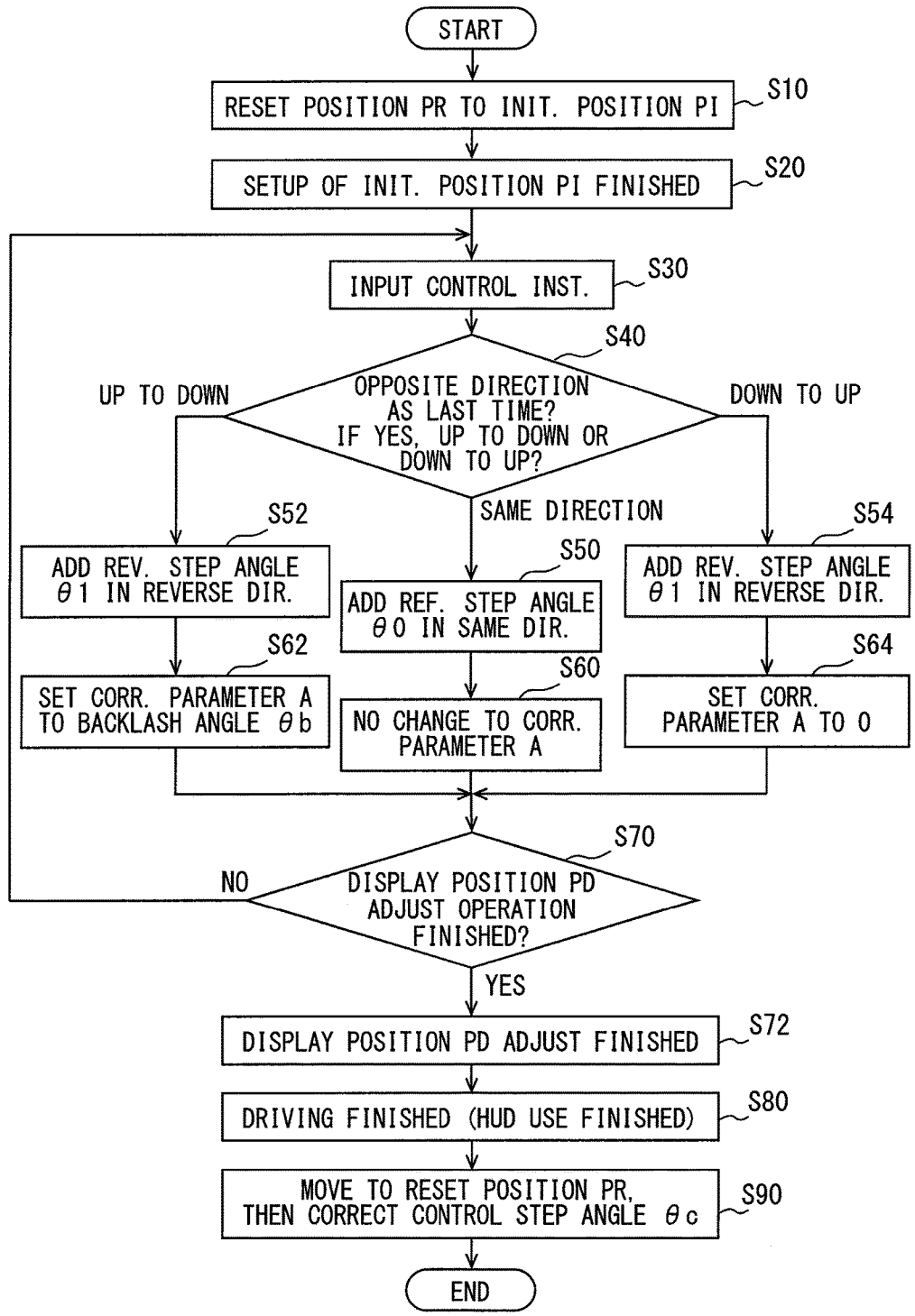
FIG. 8 is a flowchart performed by a controller of FIG. 1.
Figure 10:
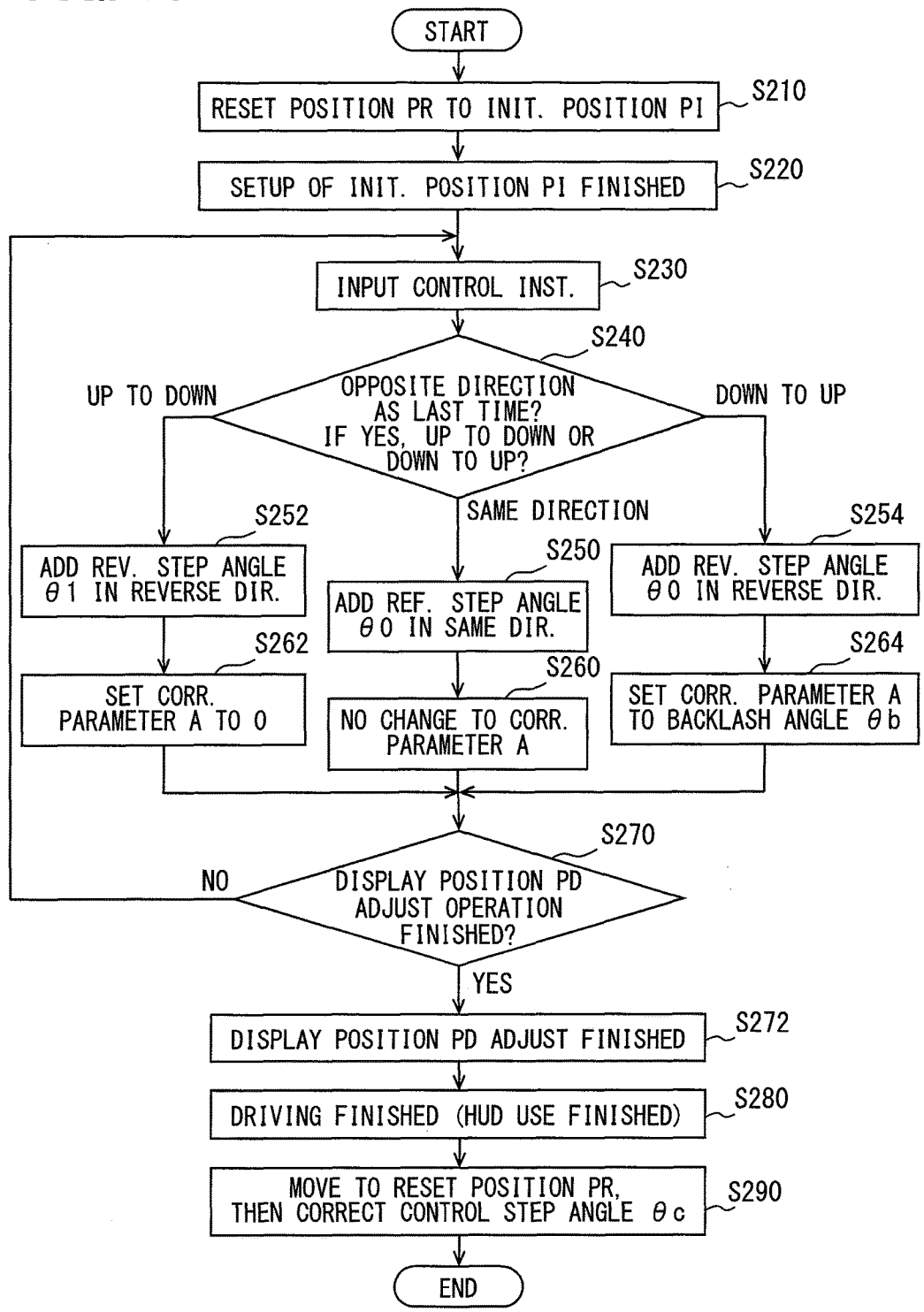
FIG. 10 is a flowchart performed by a controller of a second embodiment.

Specifically, as a first modified embodiment, the order of the processing based on the flowcharts of FIGS. 8, 10 may be changed within to an appropriate extent. For example, for steps S50 and S60, S52 and S62, S54 and S64, the order of processing may be switched. As another example, the updating of the correction parameter A at step S90 may be performed prior to steps S72 and S80.

As a second modified embodiment, the reverse step angle θ1 may be set to be greater than a sum of the reference step angle θ0 and the backlash angle θb. For example, if the reference step angle θ0 is 1 step angle, and the backlash angle θb is 1.4 steps, by rounding up with respect to the electric stability point θs of the stepper motor 40, the reverse step angle θ1 may be equal to 3 steps.

As a third modified embodiment, the reference step angle θ0 may use an angle other than 1 step angle corresponding to an electric angle of 180 degrees.

As a fourth modified embodiment, the controller 70 may not update the control step angle θc with the correction parameter A. Further, when the opposite direction is determined, the controller 70 may not overwrite the correction parameter A based on the slippage estimated from the backlash angle θb with respect to the control step angle θc. Further, the memory unit 74 may not store the correction parameter A.

As a fifth modified embodiment, the controller 70 may not reset the display of the image by rotating the reflector mirror 30 in the reset direction DR such that the image moves toward the outside-of-display region ROD.

As a sixth modified embodiment, by providing a temperature sensor that measures a use environment temperature, the controller 70 may change the reverse step angle θ1 based on the temperature measured by the temperature sensor. Specifically, the controller 70 may use for example 60° C. and 10° C. with respect to the measured temperature as boundary values to update the reverse step. As a result, even if the backlash angle θb changes as a result of temperature related expansion and contraction in the various gears 52 to 59, this may be addressed.

As a seventh modified embodiment, the controller 70 may be disposed outside of the housing 10.

As an eighth modified embodiment, methods other than the instruction switch 60 may be used to input control instructions to the controller 70. For example, a touch input to a switch displayed as an image on a navigation device, or a gesture recognition, or the like may be used.

As a ninth modified embodiment, in the light path between the projector 20 and the reflector mirror 30, or in the light path between the reflector mirror 30 and the dust proof sheet 12, other optimal elements such as reflector mirrors, lenses, or optical filters may be added.

As a tenth modified embodiment, the present disclosure may be applied to various modified bodies (transports) such as ships or airplanes other than the vehicle 1.

What is claimed is:

1. A head-up display device mounted on a moving body that projects an image on a projection member to virtually display the image to be visible to a passenger, comprising:
   a projector that projects display light;
   a reflector mirror that reflects the display light from the projector toward the projection member;
   a stepper motor that outputs rotation;
   a reduction gear mechanism formed of a plurality of gears, the reduction gear mechanism reducing the rotation which is output from the stepper motor and transmitted to the reflector mirror; and
   a controller that, based on a control instruction from the passenger, calculates a control step angle that controls the rotation of the stepper motor, wherein
   the controller includes
       a determiner that determines whether an output direction of the rotation to be output from the stepper motor according to the control instruction at this determination is the same direction or the opposite direction as a direction of the rotation to be output from the stepper motor according to the control instruction at the last determination, and
       a reverse direction adder that
           defines a reference step angle as a step angle that the stepper motor rotates by in accordance with a determination of the same direction by the determiner, and
           when the determiner determines the opposite direction, adds a reverse step angle of the opposite direction to the control step angle, the reverse step angle of the opposite direction being equal to or greater than a sum of the reference step angle and a backlash angle of the reduction gear mechanism.

2. The head-up display device of claim 1, wherein
the controller includes a same direction adder that, when the determiner determines the same direction, adds the reference step angle of the same direction to the control step angle.

3. The head-up display device of claim 1, further comprising:
   a memory unit that stores the control step angle and a correction parameter for correcting the control step angle, wherein
   the controller includes
       an updater that updates the control step angle with the correction parameter, and
       an overwriter that, when the determiner determines the opposite direction, overwrites the correction parameter based on a slippage estimated from the backlash angle with respect to the control step angle.

4. The head-up display device of claim 3, wherein
the when the determiner determines the same direction, the overwriter maintains the correction parameter as is.

5. The head-up display device of claim 3, wherein
the controller includes
    a resetter that rotates the reflector mirror in a reset direction where the image moves toward an outside-of-display region to reset display of the image, and
    an initialization position setter that rotates the reflector mirror in an initialization direction from the outside-of-display region toward an initialization position to begin display of the image, and
the overwriter is configured to
    when the determiner determines the same direction, maintain the correction parameter as is,
    when the determiner determines the opposite direction, and when the output direction matches the initialization direction, set the correction parameter to 0, and
    when the determiner determines the opposite direction, and when the output direction does not match the initialization direction, set the correction parameter to be equal in magnitude to the backlash angle.

6. The head-up display device of claim 5, wherein
the reset direction is a down-corresponding direction that causes the image to move in a down direction of the moving body,
the initialization direction is an up-corresponding direction that causes the image to move in an up direction of the moving body, and
the overwriter is configured to
    when the determiner determines the same direction, maintain the correction parameter as is,
    when the determiner determines the opposite direction, and when the output direction is the down-corresponding direction, set the correction parameter to be equal in magnitude to the backlash angle, and when the determiner determines the opposite direction, and when the output direction is the up-corresponding direction, set the correction parameter to 0.

7. The head-up display device of claim 5, wherein
the reset direction is an up-corresponding direction that causes the image to move in an up direction of the moving body,
the initialization direction is a down-corresponding direction that causes the image to move in a down direction of the moving body, and
the overwriter is configured to
   the when the determiner determines the same direction, maintain the correction parameter as is,
   when the determiner determines the opposite direction, and when the output direction is the up-corresponding direction, set the correction parameter to be equal in magnitude to the backlash angle, and
   when the determiner determines the opposite direction, and when the output direction is the down-corresponding direction, set the correction parameter to 0.

* * * * *